United States Patent Office 2,834,746
Patented May 13, 1958

2,834,746

MINERAL OIL MODIFIED POLYSTYRENE-POLY-ETHYLENE BLEND AND PROCESS OF MAKING SAME

Ival O. Salyer and Robert J. Slocombe, Dayton, Ohio, assignors to Monsanto Chemical Company, St. Louis, Mo., a corporation of Delaware No Drawing. Application January 8, 1953
Serial No. 330,352

12 Claims. (Cl. 260—33.6)

This invention relates to improved polystyrene-type resins. A specific aspect of the invention pertains to methods of improving the flexural deflection and/or tensile elongation of blends of polystyrene with polyethylene.

Polystyrene is one of the most important plastics of commerce. Its many valuable properties are well-known. However, polystyrene as ordinarily formulated is characterized by low impact strength, low flexural deflection, and low tensile elongation. Polystyrene cannot be used for many potential applications where particular toughness is required.

Polyethylene in relatively small quantities can be incorporated into polystyrene with a resultant very marked improvement in the impact strength of the polystyrene, and some improvement in the tensile elongation and flexural deflection properties. Thus, polystyrene containing from 1 to 5 weight percent polyethylene can be prepared by mechanically mixing, e. g., milling or extruding, preformed polystyrene and preformed polyethylene. A mixture in the same proportions can also be prepared by intimately incorporating preformed polyethylene in styrene monomer and then polymerizing the latter in the presence of the former, and the impact strength and other properties are even better than in the case of mechanical mixing of the same proportion of preformed polystyrene with preformed polyethylene. Ordinarily impact strength of polystyrene is not much improved by mechanically mixing it with polyethylene, but is greatly improved if the styrene is polymerized in the presence of polyethylene.

An object of this invention is to provide improved polystyrene resins. Another object of the invention is to provide a method of improving the physical properties of polystyrene-polyethylene blends. Another object is to improve the flexural deflection of polystyrene containing small amounts of polyethylene. A further object is to improve the tensile elongation of polystyrene containing small amounts of polyethylene. Still another object is to obtain the improvements mentioned in the last two-preceding objects without adversely affecting the impact strength of the polystyrene-polyethylene blend to a substantial extent. Another object is to obtain marked improvement in flexural deflection and/or tensile elongation of polystyrene-polyethylene blends by the addition of a small quantity of inexpensive material. A further object is to provide an improved process for polymerizing styrene. A further object is to improve various physical properties of polystyrene made by mass, suspension, or emulsion polymerization. Further objects and advantages of the invention will be apparent to one skilled in the art from the accompanying disclosure and discussion.

In accordance with preferred embodiments of the present invention, various or all of the foregoing objects are attained by incorporating a small quantity of a high molecular weight mineral oil in polystyrene-polyethylene blends of the nature described. The blends in question should contain a fairly small quantity, often less than 5 weight percent and sometimes up to 10 weight per cent, of polyethylene, the amount being such as to improve the impact strength of the polystyrene in the case of polymerizing styrene in the presence of polyethylene. An intimate mixture of such blend with a small quantity of high molecular weight mineral oil is formed, the quantity of said mineral oil being such as to improve the flexural deflection and/or tensile elongation of the blend. A preferred product of the present invention comprises polystyrene containing from 1 to 5 weight percent polyethylene and from 1 to 5 weight percent of a high molecular weight mineral oil plasticizer. It is preferred to limit the quantity of mineral oil so as not to adversely affect to an important degree the heat distortion or softening temperature of the polystyrene-polyethylene blend, e. g., not lower the A. S. T. M. heat distortion temperature by more than 10 to 15° C.

The most preferred method of forming an intimate mixture comprising mineral oil, polyethylene, and polystyrene, is to incorporate both the mineral oil and preformed polyethylene in styrene monomer and subject the resulting material to polymerization. For best results such polymerization should be carried to a high conversion, such as greater than 95 percent conversion to high molecular weight polystyrene, and at conditions also resulting in a polystyrene product having a molecular weight of 50,000 to 100,000, as determined by the Staudinger method from the specific viscosity of a very dilute solution of the polymer.

Rather than incorporate both mineral oil and polyethylene in styrene monomer, styrene monomer containing preformed polyethylene can be polymerized and the resulting polystyrene-type resin then mechanically admixed with the desired quantity of mineral oil. Or, less preferably, styrene containing mineral oil can be polymerized to polystyrene which is then mechanically mixed with polyethylene, in the required quantity. One simple procedure within the scope of the present invention is to form a blend by intimate mechanical admixture of polystyrene with polyethylene, and add the mineral oil during or after the mechanical mixing of the two polymers. The foregoing procedures are given by way of example, and various combinations of same, or other procedures, can be employed to form a final blend containing largely polystyrene plus relatively small quantities of polyethylene and of mineral oil. It will be appreciated that the different procedures discussed are not the full equivalents of each other. For example, when preformed polyethylene is incorporated in styrene monomer and the latter then polymerized, it is believed highly probable that a certain amount of interpolymerization occurs between styrene and polyethylene molecules with resultant formation of what can be called a graft polymer, although it is by no means certain and is even doubtful that all molecules of the polyethylene become united with one or more styrene monomer units. However, as indicated above, properties of blends so formed are much superior to the same properties of blends formed by mere mechanical admixture of preformed polystyrene with preformed polyethylene. The term "blend" is used herein in a broad sense to include both mechanical blends and blends prepared by polymerizing styrene in the presence of preformed polyethylene. Despite the entirely different chemical nature of polyethylene from polystyrene, and the chemical nature of high molecular weight mineral oil, which is entirely different from that of both polystyrene and polyethylene, the products of the present invention have a high degree of homogeneity, readily undergo injection or compression molding and other operations which are standard for polystyrene, and the molded products have excellent surface lustre.

The term "polyethylene" as employed herein refers to the normally solid high molecular weight polymers of ethylene. Such polymers usually have a molecular weight of at least 6000 and preferably for the practice of our invention have a molecular weight of 20,000 to 30,000 or above. They have a waxy feel. When examined by the X-ray diffraction technique these polyethylenes exhibit the presence of a crystalline phase. Polyethylenes suitable for the practice of our invention can readily be made by subjecting ethylene, containing say 50 to 200 parts per million oxygen, to polymerization at very high pressures, for example, 20,000 to 40,000 pounds per square inch. Various other methods of preparing solid polyethylene, for instance, by employing peroxide or azo catalysts and water or organic liquid reaction media along with moderately high pressures, for example 5000 to 10,000 pounds per square inch, are well-known in the art.

It is not outside the broad scope of our invention to utilize a solid ethylene polymer of the same general nature set forth in the preceding paragraph, but which is a copolymer of ethylene and an ethylenically unsaturated comonomer employed in an amount not to exceed 15 weight percent of the ethylene, for instance styrene, vinyl chloride, vinylidene chlorofluoride, methyl methacrylate. It is to be understood that such copolymers can be employed instead of ethylene homopolymer whenever reference is made herein to "polyethylene," and that the term "ethylene polymer" as used in the claims is inclusive of homopolymers and copolymers.

While this invention is directed particularly to homopolymers of styrene, it is permissible and not outside the broad scope of the invention to have other polymerizable unsaturated comonomers present during the polymerization in amounts preferably not to exceed 15 weight percent of the total styrene plus comonomer, provided such comonomer, for example α-methylstyrene, vinyl toluene, acrylonitrile, ethyl acrylate, butyl acrylate, is not of such nature or of such quantity as to affect adversely the desired characteristics of the resulting styrene copolymer product. It is to be understood that such copolymers can be employed instead of styrene homopolymer whenever reference is made herein to "polystyrene," and that the term "styrene polymer" as used in the claims is inclusive of homopolymers and copolymers.

In accordance with this invention styrene monomer can be polymerized alone and resulting polystyrene then admixed with polyethylene and mineral oil, or either polyethylene or mineral oil or both can be present during the styrene polymerization. In any event, for the most satisfactory results the polymermization of styrene should be effected under such conditions as will result in (a) a high degree of conversion of the styrene, measured by an alcohol soluble content of less than 5 weight percent exclusive of any mineral oil, and (b) a high molecular weight polymer having a molecular weight of between 50,000 and 100,000 on the Staudinger scale, although somewhat lower or higher molecular weights, for instance, within the range of 30,000 to 150,000, are permissible. A large variety of reaction conditions for the polymerization can be employed with satisfactory results. Thus, the polymerization can be carried out in the absence of any added catalyst. Any of the well-known styren polymerization catalysts, such as organic peroxides, inorganic peroxides, organic hydroperoxides, azo compounds and the like can be used in small quantities. The polymerization can be effected at atmospheric or superatmospheric pressures. We have found that by polymerizing styrene monomer containing from 5 to 10 percent polyethylene, in the presence of a catalyst very excellent products are obtained which products are still further improved by incorporation of mineral oil either during or after the polymerization.

The polymerization of styrene, either with or without polyethylene present, can be carried out without the use of an added catalyst, or sufficient catalyst can be employed to give a desired reaction rate. Suitable catalysts are of the free radical promoting type, principal among which are peroxide type polymerization catalysts, and azo type polymerization catalysts. Those skilled in the art are now fully familiar with a large number of peroxide type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example suitable peroxide type catalysts include: benzoyl peroxide, tertiary butyl peroxide, tertiary butyl hydroperoxide, diacetylperoxide, diethylperoxycarbonate, dimethylphenylhydroperoxide (also known as cumene hydroperoxide) among the organic peroxides; hydrogen peroxide, potassium persulfate, perborates and other "per" compounds among the inorganic peroxides. The azo type polymerization catalysts are also well-known to those skilled in the art. These are characterized by the presence in the molecule of the group —N=N—; the dangling valences can be attached to a wide variety of organic radicals, at least one, however, preferably being attached to a tertiary carbon atom. By way of example of suitable azo type catalysts can be mentioned α,α'-azodiisobutyronitrile, p-bromobenzenediazonium fluoborate, n-nitroso-p-bromoacetanilide, azomethane, phenyldiazonium halides, diazoaminobenzene, p-bromobenzenediazonium hydroxide, p-tolyldiazoaminobenzene. The peroxy type or azo type polymerization catalyst is used in small but catalytic amounts, which are generally not in excess of 1 percent by weight based upon the monomeric material. A suitable quantity is often in the range of 0.05 to 0.5 percent by weight.

Styrene polymerization can be effected in accordance with the present invention by mass polymerization, i. e., the reaction mixture consists of the monomer plus any catalyst used, plus polyethylene and/or mineral oil if either is to be incorporated during the polymerization, and no added solvent or other reaction medium is present. Polymerization can also be carried out by the suspension or emulsion techniques. For suspension polymerization a reaction medium such as water is used together with a small amount of a suspending agent, for example tricalcium phosphate, to give a suspension of particles of initial reaction mixture, which particles grow in size as the polymerization proceeds yet are not of such small size as to result in a permanently stable latex. To effect emulsion polymerization, sufficient amount of emulsifying agent, for example, a water-soluble salt of a sulfonated long chain alkyl aromatic compound, is employed in suitable quantity along with vigorous agitation whereby an emulsion of the reactants in water is formed and the product is obtained in the form of a latex. The latex can then be coagulated if desired by known methods and the polymer separated from the water. The presence of dissolved polyethylene in the styrene monomer makes it more difficult to form an emulsion when practicing our invention with dissolved polyethylene by the emulsion polymerization technique than is the case of styrene monomer alone. However, the emulsion technique has certain advantages particularly in that a very high degree of conversion is attained. Conventional recipes and procedures for effecting mass, suspension and emulsion polymerization of styrene are so well-known to those skilled in the art that they need not be reiterated here. Polymerization can be effected by any of the conventional procedures with suitable modifications where necessary because of the presence of the polyethylene in the monomeric styrene. Use of an added organic solvent during the polymerization is apt to result in too low a molecular weight product, and therefore if such a solvent is desired other conditions should be such as to result in a high molecular weight product; for example, the use of a very high pressure tends to increase the molecular weight of the product under these circumstances. The presence of small quantities of mineral oil employed in the present invention in styrene undergoing polymerization does not greatly affect the conditions or technique required for obtaining polymerization.

Ordinarily less than 5 weight percent of polyethylene, based on the combined weight of polystyrene plus polyethylene, is used. However, higher quantities of from 5 to 10 weight percent polyethylene can be used to distinct advantage by incorporating preformed polyethylene in styrene and then polymerizing under certain conditions. Thus, when polymerization conditions are such as to give a very rapid polymerization, as when a relatively high reaction temperature is used and/or a very high pressure, and also in the case in which catalysts are used, it is usually found desirable to employ in the monomeric styrene a somewhat larger proportion of polyethylene than that used with slow polymerizations or in the absence of catalysts. Thus, where no catalyst is used and the polymerization is effected over a period of, say, 24 hours or longer, the quantity of polyethylene employed in the monomer is usually less than 5 weight percent of the total mixture of styrene plus polyethylene, whereas in the other instances cited above where the polymerization occurs rapidly or where a catalyst is used, a quantity of polyethylene within the range of from 5 to 10 weight percent gives outstanding results. One preferred embodiment of our invention comprises subjecting styrene containing polyethylene in amounts such as to improve the impact strength of the polystyrene, to polymerization at a pressure of at least 5,000 pounds per square inch for time to effect greater than 95 percent conversion to high molecular weight polystyrene. Polyethylene in an amount of at least 5 weight percent can be advantageously used by polymerizing at a pressure of at least 40,000 pounds per square inch. Preferably the mineral oil is also present during the polymerization, although, if desired, it can be incorporated by mechanical mixing with the blend prepared in the foregoing manner, after the polymerization has been completed.

The high molecular weight mineral oil which is used in this invention might be considered to act as a plasticizer for the polystyrene-polyethylene blend. However, it is not known just how the favorable results of the present invention actually come about. As noted before, and as will be apparent from the data given hereinafter, very marked improvements in the flexural deflection and the tensile elongation of polystyrene containing limited amounts of polyethylene are obtained, yet the impact strength is usually not adversely affected. In contrast to the outstanding improvement in both tensile elongation and flexural deflection of the polystyrene-polyethylene blends, obtained by the practice of this invention, similar incorporation of high molecular weight mineral oil in polystyrene per se gives no significant improvement in either of these properties.

The mineral oil should be of lubricating viscosity for best results; within the range of lubricating viscosities of course lies a considerable variation in actual viscosity and properties. Mineral lubricating oils are quite well-known to those skilled in the art. The mineral oil employed should be principally aliphtic hydrocarbon in character, and preferably at least 80 percent should have a boiling point of at least 300° C. corrected to atmospheric pressure. Incorporation of considerable quantities of lower molecular weight material tends to affect the physical properties of the finished product adversely. While a residual oil can be used, it is much preferred that the high molecular weight mineral oil be a distillate. The mineral oil is best obtained from petroleum sources, and the extent of paraffinicity, naphthenicity, and aromaticity will, of course, be dependent upon the particular type of petroleum used as source material. However, it should be principally aliphatic paraffinic in nature. Where opaque or colored plastics are permissible products, the high molecular weight mineral oil employed in the invention can have some color. However, where a clear product is required, the mineral oil should undergo sufficient purification treatment to be clear and essentially free from color. In some instances such treatment will involve only distillation, whereas with other types of mineral oils it may be necessary to subject the same to rigorous chemical treatment, e. g., sulfonation or aluminum chloride treatment, and/or treatment with adsorbents, in order to obtain a clear mineral oil, which treatments will also serve to remove most or all of any aromatic hydrocarbons present.

Among high molecular weight mineral oils contemplated by the invention are those which do not yield paraffin, i. e., normally solid paraffin wax, whether or not such paraffin is contained therein, essentially comprising refined substantially paraffin-free mineral or petroleum oils. An optimum embodiment of such oil is that referred to as "liquid petrolatum." The liquid petrolatum may or may not contain paraffin, but if present, the paraffin should be present in a state whereby it is not susceptible to removal, at least under normal conditions. A suitable liquid can be defined as the oil which is obtained by the distillation of that portion of petroleum which boils between 330° C. and 390° C. and is obtained after removal of the lighter constituent of the petroleum; the distillate fraction obtained between 330° C. and 390° C. is subjected to a comprehensive purification treatment with sulphuric acid and caustic soda, followed by filtration while hot through a decolorizing carbon. On cooling said purified fraction, some solid paraffin separates out, and the liquid portion is subjected to redistillation, with that portion boiling above 360° C., being retained as the liquid petrolatum. Suitable liquid petrolatums are commercially available, for example those sold under the trade names "Nujol" and "Fractol." While liquid petrolatum or "mineral oil" as generally available, especially when in accordance with the requirements of the U. S. Pharmacopoeia, satisfies the said details of production, it will be understood that within the scope of the present invention, a reasonable latitude as to the characteristics of the product may be contemplated. Thus, the temperature range indicated for the distillate fractions may be deviated within a reasonable scope without unduly affecting the value of the fraction for purposes of the present invention.

The following examples are provided to illustrate some of the advantages of our invention. It will be appreciated that numerous variations from the specific details can be made without departing from the invention in its broadest aspects. It must be remembered in interpreting the data that physical properties are dependent on conditions employed in processing and molding the test samples. In injection molding of these types of polymers, the physical properties are influenced by the amount of orientation achieved in the molding process which in turn is dependent upon the temperature at which molding is carried out. Highest values of physical properties are obtained at the lowest molding temperatures. Rigorous comparison of actual values is best made not on specimens molded at identical temperatures but rather on specimens molded at the same number of degrees above the minimum molding temperature for each particular specimen, which minimum molding temperature may vary from specimen to specimen. The minimum molding temperature is the temperature required to just fill the die at normal injection molding pressure.

EXAMPLE 1

Plasticization of polystyrene containing 2½ percent polyethylene was investigated using 2½ percent of four different liquids, viz: xylene, "Nujol" (a highly purified mineral lubricating oil or liquid petrolatum meeting U. S. P. standards for internal use), commercial polystyrene plasticizer A (a high-boiling liquid consisting of partially hydrogenated polycyclic hydrocarbons), and commercial polystyrene plasticizer B (a highly chlorinated polycyclic hydrocarbon liquid). In each case the polyethylene was swollen or dissolved in the particular plasticizer by heating, and the resulting mixture mechanically compounded with the polystyrene. The percentages mentioned are based on the final plasticized blend.

Data are reported in Table I below.

Only one of the added liquids, viz., "Nujol," gave important improvements in the properties of the product. That containing the "Nujol" mineral oil showed a definite tensile yield point, and had greater tensile elongation and flexural deflection than the other samples or the control. The impact strength was lower than that of the control because all test samples were molded at the same temperature, which temperature was higher above the minimum molding temperature for the plasticized blends than for the control; samples molded at minimum molding temperature or at a fixed number of degrees above minimum molding temperature show no loss of impact strength when compared with the control molded at its minimum molding temperature or at the same number of degrees above its minimum molding temperature, respectively (see Table V below).

of the ingredients at the 1, 2, 3 and 5 percent levels of concentration of both polyethylene and mineral oil. The samples were then injection molded into micro strength specimens on the 1 ounce Watson-Stillman injection molding machine using a cylinder stock temperature of 145° C. After conditioning a minimum of 24 hours at 25° C. and 50 percent relative humidity, tensile and flexural strength measurements were made following standard A. S. T. M. procedures. Impact strength was measured by the Izod method on notched ⅛ inch x ½ inch x 2½ inch micro flexural bars. The comments given in Example 1 concerning effect of molding temperature on impact strength are equally applicable here.

*Table II*

| Percent Composition | | Tensile Strength, p. s. i. | | Tensile Elongation, percent | | Flexural Strength, p. s. i. | | Flexural Deflection, inches | | Impact Strength, ft. lbs., Notched |
|---|---|---|---|---|---|---|---|---|---|---|
| PE | N | Yield | Failure | Yield | Failure | Yield | Failure | Yield | Failure | |
| 1 | 1 | ------ | 8,773 | ------ | 3.3 | 15,581 | 15,089 | ---- | .27 | .40 |
| 1 | 2 | ------ | 7,418 | ------ | 2.9 | 14,461 | 13,019 | .3 | .3 | .35 |
| 1 | 3 | 7,382 | 7,109 | 2.1 | 2.4 | 13,070 | 12,445 | ---- | .36 | .30 |
| 1 | 5 | 6,567 | 5,963 | 1.9 | 5.9 | 12,544 | 10,051 | ---- | .27 | .28 |
| 2 | 1 | 7,824 | 7,642 | 3.3 | 3.3 | 13,556 | 11,823 | .29 | .40 | .40 |
| 2 | 2 | 6,826 | 5,936 | 3.5 | 4.3 | 13,236 | 10,069 | .31 | .59 | .31 |
| 2 | 3 | 6,625 | 6,096 | 2.3 | 4.2 | 15,204 | 11,718 | .26 | .33 | .36 |
| 2 | 5 | 6,080 | 5,809 | 2.0 | 9.6 | 11,208 | 7,856 | .26 | .38 | .29 |
| 3 | 1 | 7,618 | 7,310 | 3.3 | 4.0 | 13,635 | 9,165 | .30 | .60 | .45 |
| 3 | 2 | 6,707 | 6,144 | 2.4 | 5.8 | 12,357 | 8,500 | .42 | .75 | .29 |
| 3 | 3 | 6,203 | 6,009 | 2.5 | 16.0 | 11,695 | 7,509 | .425 | .91 | .30 |
| 3 | 5 | 5,712 | 5,499 | 2.0 | 8.7 | 10,729 | ------ | .33 | .81 | .27 |
| 5 | 1 | 7,664 | 6,505 | 2.7 | 5.2 | 12,639 | 6,590 | .42 | .88 | .32 |
| 5 | 2 | 5,934 | 5,683 | 1.7 | 9.7 | 11,190 | ------ | .42 | 1.00 | .27 |
| 5 | 3 | 5,041 | 4,892 | 1.9 | 13.4 | 10,212 | 3,340 | .44 | .89 | .26 |
| 5 | 5 | 4,521 | 4,796 | 1.4 | 15.7 | 8,925 | ------ | .49 | .84 | .23 |

PE—Polyethylene.
N—Nujol mineral oil.

Among these samples, the most desirable concentrations for overall improvement of properties are 2 to 3 percent polyethylene with 1 to 2 percent mineral oil.

EXAMPLE 3

The effects of mineral oil were studied by adding 2½ percent polyethylene in one instance, and 2½ percent polyethylene plus 1½ percent "Nujol" (a highly purified mineral lubricating oil meeting U. S. P. specifications for internal use) in another instance, to styrene monomer, and polymerizing the latter in the presence of the former without catalyst at 90° C. in a stirred flask for about 8 hours. The syrup was then transferred to test tubes and polymerization completed using an additional 16 hours at 90° C. followed by about 24 hours at 120° C.

*Table I*

MECHANICALLY MIXED POLYBLENDS OF POLYSTYRENE WITH 2½% POLYETHYLENE
[Effect of 2½% plasticizer.]

| Plasticizer | Tensile | | | Flexural | | Impact Strength, Notched Ft. lbs./in. Notch |
|---|---|---|---|---|---|---|
| | Strength Yield, p. s. i. | Strength Failure, p. s. i. | Elong. to Break, percent | Strength, p. s. i. | Deflec., Inches | |
| None (Control) [1] | ---------- | 8,532 | 3.0 | 15,849 | 0.20 | .40 |
| Xylene | ---------- | 7,695 | 2.7 | 15,105 | 0.26 | .27 |
| Mineral oil | 6,362 | 7,064 | 5.0 | 13,518 | 0.46 | .27 |
| Commercial A | ---------- | 8,366 | 3.2 | 15,320 | 0.25 | .32 |
| Commercial B | ---------- | 7,618 | 3.2 | 16,230 | 0.26 | .31 |

[1] The control consisted of 97½% polystyrene and 2½% polyethylene.

EXAMPLE 2

Effects of different proportions of polyethylene and high molecular weight mineral oil ("Nujol") in polystyrene are illustrated by the data in Table II. Mechanical mixtures were prepared by mill roll incorporation and 8 hours at 180° C. The polymer was then sheeted on hot mill rolls for 5 minutes, ground to molding powder size in the Abbe Cutter and injection molded into standard micro test specimens. Strength properties measured on the product show excellent increase in tensile elongation and flexural deflection due to the addition of "Nujol"

plasticizer. See Table III. Impact strength is higher than for mechanically mixed polystyrene blend prepared by mill rolling and containing the same percentages of polyethylene and "Nujol," as shown in Table IV.

and are therefore higher than if measured in the molten plastic stock itself. Values at minimum molding temperature (MMT) plus 5° C., and at MMT plus 30° C. are given in Table V.

*Table III*

POLYMERIZATION POLYBLENDS OF POLYSTYRENE/POLYETHYLENE

| Percent Composition[1] | | Tensile Strength, p. s. i. | | Tensile Elongation, percent | | Flexural Strength, p. s. i. | | Flexural Deflection, inches | | Impact Strength, ft. lbs., Notched |
|---|---|---|---|---|---|---|---|---|---|---|
| PE | N | Yield | Failure | Yield | Failure | Yield | Failure | Yield | Failure | |
| 2½ | ---- | 8,250 | 8,064 | 3.5 | 4.0 | 15,702 | 13,504 | .28 | .38 | .88 |
| 2½ | 1½ | 6,895 | 6,082 | 3.3 | 7.2 | 13,278 | ------ | .44 | [2]1.01 | .85 |

[1] PE—Polyethylene. N—"Nujol," a highly purified clear mineral lubricating oil meeting U. S. P. standards for internal use.
[2] No failure; limit of test.

*Table IV*

MECHANICALLY MIXED POLYBLEND OF POLYSTYRENE/POLYETHYLENE

| Percent Composition[1] | | Tensile Strength, p. s. i. | | Tensile Elongation, percent | | Flexural Strength, p. s. i. | | Flexural Deflection, inches | | Impact Strength, ft. lbs./in. Notch, Notched |
|---|---|---|---|---|---|---|---|---|---|---|
| PE | N | Yield | Failure | Yield | Failure | Yield | Failure | Yield | Failure | |
| 2½ | 1½ | 7,453 | 6,415 | 2.8 | 4.3 | 13,587 | 10,616 | .30 | .66 | .32 |

[1] PE—Polyethylene. N—"Nujol," as described above in Table III.

EXAMPLE 4

The following samples were tested:

A. Commercial polystyrene made by mass polymerization.

B. 98 parts (by weight) polystyrene A, 2 parts Nujol mineral oil.

C. 97½ parts polystyrene A, 2½ parts D. Y. N. H. commercial polyethylene.

D. 96 parts polystyrene A, 2½ parts D. Y. N. H. commercial polyethylene (same polyethylene as used in C), 1½ parts Nujol.

Samples A, B, C, and D were prepared by milling for 5 minutes at 165° C. All tests were made by the same operator and on the same machines. Notched impact strengths were determined on a series of test specimens for each of the samples, specimens in each series being made at a variety of molding temperatures. Molding temperatures in these tests were measured in the cylinder

*Table V*

EFFECT OF INJECTION MOLDING TEMPERATURE ON NOTCHED IMPACT STRENGTH

| Sample | MMT, ° C. | Notched Impact Strength, ft. lbs./inch notch | |
|---|---|---|---|
| | | at MMT plus 5 | at MMT plus 30 |
| A—Polystyrene | 170 | 0.79 | 0.43 |
| B—Polystyrene+Nujol | 165 | 0.52 | 0.35 |
| C—Polystyrene+Polyethylene | 160 | 0.83 | 0.31 |
| D—Polystyrene+polyethylene+Nujol | 155 | 0.83 | 0.35 |

From the data in Table I, it is apparent that while the mineral oil greatly decreased the impact strength of polystyrene (B vs. A), this was not true at all in the case of mineral oil incorporated with polystyrene plus polyethylene (D vs. C). Also to be noted is the adverse effect of higher molding temperature on the impact strength of all samples.

In Table VI are given results of standard tensile and flexural tests on the above-identified samples A, B, C, and D, determined on specimens molded at minimum molding temperatures plus 5° C. (MMT+5), and at minimum molding temperature plus 30° C. (MMT+30).

*Table VI*

EFFECTS OF POLYETHYLENE AND MINERAL OIL ON TENSILE AND FLEXURAL PROPERTIES OF POLYSTYRENE

| | Tensile Properties | | | | Flexural Properties | | | |
|---|---|---|---|---|---|---|---|---|
| | Strength, p. s. i. | | Elongation, percent | | Strength, p. s. i. | | Deflection, inch | |
| | Yield | Break | Yield | Break | Yield | Break | Yield | Break |
| MMT+5: | | | | | | | | |
| A—Polystyrene | | 8,550 | | 5.9 | 16,700 | 14,100 | 0.21 | 0.27. |
| B—Polystyrene+Nujol | | 8,650 | | 6.4 | 16,100 | 15,300 | 0.22 | 0.22. |
| C—Polystyrene+Polyethylene | 8,770 | 8,320 | 5.9 | 7.2 | 16,100 | 5,290 | 0.23 | 0.59. |
| D—Polystyrene + Polyethylene + Nujol | 7,710 | 6,440 | 7.1 | 11.7 | 14,300 | 9,000 | 0.17 | no break at 0.8". |
| MMT+30: | | | | | | | | |
| A—Polystyrene | | 7,330 | | 3.9 | | 15,900 | | 0.22. |
| B—Polystyrene+Nujol | | 6,930 | | 4.4 | | 14,600 | | 0.18. |
| C—Polystyrene+Polyethylene | | 7,920 | | 5.3 | 15,200 | 8,670 | 0.22 | 0.25. |
| D—Polystyrene + Polyethylene + Nujol | 6,460 | 5,860 | 4.3 | 10.2 | 12,700 | 8,760 | 0.18 | no break at 0.8". |

The data of Table VI show the following. Here, as in Table V, the adverse effect of higher molding temperatures on properties is noted.

*Tensile strength.*—As to tensile strength, neither mineral oil alone (B), nor polyethylene alone (C) appreciably lowers the tensile strength, and the latter gives a yield point at MMT+5 and appreciably increases tensile strength at MMT+30. Mineral oil and polyethylene together (D) definitely lower tensile strength, but give a yield point at MMT+30.

*Tensile elongation.*—In this property, mineral oil (B) improves the polystyrene a little, polyethylene (C) improves it more, but mineral oil and polyethylene together (D) increase the tensile elongation tremendously.

*Flexural strength.*—Mineral oil alone (B) at MMT +5 slightly lowers flexural strength at yield and appreciably increases it at break, while at MMT +30 it appreciably lowers flexural strength at break. Polyethylene alone (C) at MMT +5 slightly lowers flexural strength at yield but greatly lowers it at break, and at MMT +30 greatly lowers flexural strength at break but does give a definite yield point. The combination of mineral oil and polyethylene with polystyrene (D) at MMT +5 lowers flexural strength some at the yield point but the specimen dos not break at all at the limitation of the instrument (0.8 inch deflection); this material exhibits similar effects at MMT +30.

*Flexural deflection.*—Mineral oil has little effect on this property. Polyethylene alone (C) at MMT +5 doubles the flexural deflection at break, and at MMT +30 gives a slightly higher flexural deflection than polystyrene alone and further gives a yield point. Mineral oil plus polyethylene incorporated in polystyrene (D) results in a product which undergoes the full deflection of which the testing instrument is capable (0.8 inch) without breaking at all; this product also has a definite yield point at MMT +30 which is not true of the polystyrene alone.

EXAMPLE 5

A mixture of 93.5 weight percent styrene, 5 percent polyethylene and 1.5 percent "Nujol," containing 0.01 weight percent ditertiarybutyl peroxide, was subjected to the following polymerization cycle:

26 hours at 90° C.
28½ hours at 120° C.
4½ hours at 180° C.

The product had the following properties:

Tensile, p. s. i. _____ 8413
Elongation, percent _____ 6
Notched impact, ft. lb./in. notch [1] _____ 2.16

[1] Sample injection molded at minimum molding temperature plus 5° C. This example shows the advantageous use of 5 percent polyethylene through use of added catalyst in the polymerization.

Products of this invention are especially useful in making injection molded and compression molded articles, and can also be used in other forms, for example films, surface coatings, and monofilaments. They can be mixed with other materials such as pigments, plasticizers, natural and synthetic resins, fillers and the like.

While the invention has been described herein with particular reference to various preferred embodiments thereof, and numerous examples have been given of suitable proportions and conditions, it will be appreciated that variations from the details given herein can be effected without departing from the invention in its broadest aspects.

We claim:

1. A method of improving a blend of 90 to 99 parts by weight styrene polymer and 10 to 1 parts by weight ethylene polymer, which comprises forming an intimate mixture of said blend with from 1 to 5 weight percent, based on the total weight of said mixture, of a high molecular weight mineral oil, said styrene polymer being a normally solid high molecular weight styrene polymer composed at least principally of styrene, said ethylene polymer being a normally solid high molecular weight ethylene polymer composed at least principally of ethylene, and said mineral oil being a high molecular weight mineral oil which is principally aliphatic hydrocarbon in character and at least about 80 percent of which has a boiling point of at least 300° C. corrected to atmospheric pressure.

2. A method according to claim 1 wherein said blend is made by mechanically mixing preformed styrene polymer and preformed ethylene polymer.

3. A method according to claim 1 wherein said blend is made by polymerizing a polymerizable unsaturated monomeric material composed at least principally of styrene, containing preformed ethylene polymer.

4. A method according to claim 3 wherein said mixture of blend with mineral oil is formed by mechanical admixture of blend with mineral oil after formation of said blend.

5. A method according to claim 3 wherein said mixture of blend with mineral oil is formed by incorporating said mineral oil in said monomeric material containing ethylene polymer prior to polymerizing said monomeric material.

6. Styrene polymer containing from 1 to 5 weight percent ethylene polymer of molecular weight of at least 6,000 and from 1 to 5 weight percent of high molecular weight mineral oil plasticizer, said percentages being based on total product, said styrene polymer being a normally solid high molecular weight styrene polymer composed at least principally of styrene, said ethylene polymer being a normally solid ethylene polymer composed at least principally of ethylene, and said mineral oil being a high molecular weight mineral oil which is principally aliphatic hydrocarbon in character and at least about 80 percent of which has a boiling point of at least 300° C. corrected to atmospheric pressure.

7. Styrene polymer containing from 1 to 5 weight percent preformed ethylene polymer and from 1 to 5 weight percent of a high molecular weight mineral oil plasticizer, said percentages being based on total product, said ethylene polymer and mineral oil having been present in the polymerizable unsaturated monomeric material composed at least principally of styrene from which said styrene polymer was derived, said styrene polymer being a normally solid high molecular weight styrene polymer composed at least principally of styrene, said ethylene polymer being a normally solid high molecular weight ethylene polymer composed at least principally of ethylene, and said mineral oil being a high molecular weight mineral oil which is principally aliphatic hydrocarbon in character and at least about 80 percent of which has a boiling point of at least 300° C. corrected to atmospheric pressure.

8. A product according to claim 7 wherein said styrene polymer is styrene homopolymer and said ethylene polymer is ethylene homopolymer.

9. Styrene polymer containing about 2½ weight percent preformed ethylene polymer and about 1½ weight percent of a high molecular weight mineral oil, said percentages being based on total product, said ethylene polymer and mineral oil having been present in the polymerizable unsaturated monomeric material composed at least principally of styrene from which said styrene polymer was derived by mass polymerization, said styrene polymer being a normally solid high molecular weight styrene polymer composed at least principally of styrene, said ethylene polymer being a normally solid high molecular weight ethylene polymer composed at least principally of ethylene, and said mineral oil being a high molecular weight mineral oil which is principally aliphatic hydrocarbon in character and at least about 80 percent of which has a boiling point of at least 300° C. corrected to atmospheric pressure.

10. A process which comprises subjecting an initial reaction mixture comprising a polymerizable unsaturated monomeric material composed at least principally of styrene, from 1 to 5 weight percent swelled or dissolved ethylene polymer, and from 1 to 5 weight percent of a high molecular weight mineral oil, to mass polymerization conditions resulting in a styrene polymer product of 50,000 to 100,000 Staudinger molecular weight, an alcohol soluble content of less than 5 percent exclusive of said mineral oil, and a higher notched bar impact strength and higher tensile elongation and flexural deflection than styrene polymer made at said conditions without said ethylene polymer and mineral oil, said ethylene polymer being a normally solid high molecular weight ethylene polymer composed at least principally of ethylene, and said mineral oil being a high molecular weight mineral oil which is principally aliphatic hydrocarbon in character and at least about 80 percent of which has a boiling point of at least 300° C. corrected to atmospheric pressure.

11. A process according to claim 10 wherein said styrene polymer is styrene homopolymer and said ethylene polymer is ethylene homopolymer.

12. Styrene polymer containing from 1 to 10 weight percent ethylene polymer and from 1 to 5 weight percent of high molecular weight mineral oil plasticizer, said percentages being based on total product, said styrene polymer being a normally solid high molecular weight styrene polymer composed at least principally of styrene, said ethylene polymer being a normally solid high molecular weight ethylene polymer composed at least principally of ethylene, and said mineral oil being a high molecular weight mineral oil which is principally aliphatic hydrocarbon in character and at least about 80 percent of which has a boiling point of at least 300° C. corrected to atmospheric pressure.

References Cited in the file of this patent
UNITED STATES PATENTS

| 2,529,261 | Powers | Nov. 7, 1950 |
| 2,619,478 | Wehr et al. | Nov. 25, 1952 |

FOREIGN PATENTS

| 613,018 | Great Britain | Nov. 22, 1948 |